United States Patent [19]
Suh et al.

[11] 3,983,080
[45] Sept. 28, 1976

[54] EXTRUSION FOAMING OF NORMALLY CRYSTALLINE VINYLIDENE CHLORIDE POLYMERS

[75] Inventors: Kyung W. Suh; Richard E. Skochdopole; Malcolm E. Leduc, all of Midland, Mich.

[73] Assignee: The Dow Chemical Company, Midland, Mich.

[22] Filed: Sept. 20, 1974

[21] Appl. No.: 508,024

[52] U.S. Cl............................. 260/2.5 B; 260/2.5 E
[51] Int. Cl.² ............................................ C08J 9/18
[58] Field of Search...................... 260/2.5 E, 2.5 B

[56] References Cited
UNITED STATES PATENTS

| | | | |
|---|---|---|---|
| 3,474,049 | 10/1969 | Chuppelear et al. | 260/2.5 E |
| 3,650,992 | 3/1972 | Schwoegler | 260/2.5 B |
| 3,751,377 | 8/1973 | Buckney | 260/2.5 E |
| 3,776,989 | 12/1973 | Annis et al. | 264/53 |
| 3,821,129 | 6/1974 | Johnson | 260/2.5 E |

*Primary Examiner*—John Kight, III
*Attorney, Agent, or Firm*—Ronald G. Brookens

[57] ABSTRACT

This invention is directed to a process for forming stable, low density, fine celled extruded foam from normally crystalline vinylidene chloride polymers such process comprising (1) forming an admixture of a normally crystalline vinylidene chloride polymer in powder form with a blowing agent composed of a compound or mixture of compounds having a boiling point of less than about 40°C, a vapor pressure at the foaming temperature used of greater than atmospheric pressure and less than about 1000 p.s.i. and a solubility parameter of greater than about 6.6 and less than about 8.7, then (2) extrusion foaming the admixture using an extrusion temperature of from about 120°C to about 150°C.

4 Claims, No Drawings

EXTRUSION FOAMING OF NORMALLY CRYSTALLINE VINYLIDENE CHLORIDE POLYMERS

BACKGROUND

The normally crystalline vinylidene chloride polymers, i.e., those polymers containing at least about 70 weight percent of vinylidene chloride in the polymer molecule, and which exhibit crystallinity when examined by X-ray diffraction methods or between crossed Nicol prisms and compositions prepared therefrom by the inclusion of modifying agents, which composition retain the working characteristics of the crystalline polymers, are known to possess desirable physical and chemical properties such as resistance to ignition and combustion, toughness and insolubility in common solvents. Such polymers are generally useful in the formation of synthetic fibers, yarns, coatings and films.

Heretofore, however, such polymers have not been adaptable to conventional extrusion techniques used for the preparation of foamed structures due, primarily, to the inherent insolubility in these polymers of compounds conventionally used as blowing agents and to their high softening point, i.e., softening points above 100°C, coupled with the propensity to degrade with the evolution of HCl, at temperatures only slightly above those temperatures necessary for polymer fabrication.

Prior attempts to prepare foamed normally crystalline vinylidene chloride polymers include, the work of T. W. Sarge and F. H. Justin (U.S. Pat. No. 2,695,427, issued Nov. 30, 1954) which produced a vinylidene chloride polymer foam of open-cell structure having a density as low as about 15 pcf by forming an admixture of a normally crystalline vinylidene chloride polymer and from about 1 to 15 percent by polymer weight of an alkali metal bicarbonate, then subjecting such mixture to a radio frequency field until the mixtures attained a temperature less than 200°C but at least as high as the softening point of the polymer, and removing the resulting foamed product from the field before the copolymer degraded significantly. Such process, however, never attained commercial significance.

Related technology is also set forth in U.S. Pat. No. 2,948,048, issued Aug. 9, 1960. This patent contemplates a process for the preparation of oriented filaments composed of a normally crystalline vinylidene chloride polymer, such filaments having elongated microscopic voids throughout to provide a satiny appearance. These materials were obtained by blending trisodium aconitate with the polymer then extruding such blend as a monofilament. The monofilament was subsequently super-cooled, then warmed slightly and stretched to impart orientation thereto. Further, U.S. Pat. No. 3,322,695, issued May 30, 1967 contemplates the preparation of rigid cross-linked polymeric macroporous beads (including vinylidene chloride polymer beads having a plurality of interconnecting pores) by polymerization of the necessary monomer in the presence of from about ½ to about 20 times the weight of monomers of a solvent which is miscible with the unpolymerized material and exhibits limited solubility for the polymeric form of the monomeric material. Still further, U.S. Pat. No. 3,751,377, issued Aug. 7, 1973 contemplates processing vinylidene chloride copolymers wherein a volatile fluid foaming agent, which is generally a non-solvent for the resin, is admixed with the heat plastified resin and passed through an interfacial surface generator prior to being extruded into foam form.

It is the primary objective of the present invention to provide an industrially suitable means for preparing extruded foam from normally crystalline vinylidene chloride polymer wherein such foam is highly stable, i.e. shrinkage resistant; of relatively low density, i.e., having a density of less than about 15 pcf; is desirably resistant to chemicals, ignition and combustion; has low water vapor and oxygen transmission rates, and has high heat distortion values, i.e., can resist temperatures up to about 150°C.

SUMMARY

The above and related objects are attained by utilization of a process comprising (1) admixing a normally crystalline vinylidene chloride polymer in comminuted form, e.g. in powder or thin film platelet form with from about 5 to about 25 percent based on polymer weight of a blowing agent selected from a compound or compound mixture having a boiling point of less than about 40°C, a vapor pressure at the foaming temperature used of greater than atmospheric pressure but less than about 1000 p.s.i. and a solubility parameter ($\delta$) of greater than about 6.6 and less than about 8.7, then (2) extrusion foaming the admixture using an extrusion temperature of from about 120°C to about 150°C.

Description of the Preferred Embodiments

The Foamable Polymers

The normally crystalline vinylidene chloride polymers that are useful in the process of the present invention are those containing at least about 70 percent by weight of vinylidene chloride together with 30 percent or less of a copolymerizable monoethylenic monomer. Exemplary of such monomers are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl ethers and others, butadiene and chloropropene. Known ternary compositions also may be employed advantageously. Representative of such polymers are those composed of at least 70 percent by weight of vinylidene chloride with the remainder made up of, for example, arolein and vinyl chloride, acrylic acid and acrylontrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known. Particularly useful for the purposes of the present invention, are copolymers of from about 70 to about 95 percent by weight vinylidene chloride with the balance being vinyl chloride. Such copolymers may contain conventional amounts and types of plasticizers, stabilizers, nucleators and extrusion aids. Further, blends of two or more of such normally crystalline vinylidene chloride polymers may be used as well as blends comprising such normally crystalline polymers in combination with other polymeric modifiers e.g. the copolymers of ethylene-vinyl acetate, styrene-maleic anhydride, styrene-acrylonitrile and polyethylene.

The Blowing Agents

As discussed supra, suitable blowing agents may be selected from a compound, or compound mixture, having a boiling point of less than about 40°C; a vapor pressure at the foaming temperature used of greater than atmospheric pressure and less than about 1000 p.s.i.; and a solubility parameter ($\delta$) of greater than about 6.6 and less than about 8.7.

Solubility parameters are discussed in "Some Factors Affecting the Solubility of Polymers" by P. A. Small, Journal of Applied Chemistry 3, 71 (1953) and also by Harry Burrell in the "Interchemical Review" 14, 3-16, 31-46 (1955). For mixed solvents the value of $\delta$ is readily calculated by additive averaging on a weight basis. At the present time, the most widely used method of predicting the solubility of semi-crystalline polymers is based on the Flory's theory (P. J. Flory, "Principles of Polymer Chemistry," Cornell University Press, Ithaca, N.Y., 1953, Chapt. XIII) of melting point depression given by $$1/T_M - 1/T_M o = (RV_u/\Delta H_u V_1)(\phi_1 - \chi_T \phi_1^2) \quad (1)$$

wherein $T_M$ is the solution temperature, $T_M o$ is the melting temperature of the pure polymer, $\Delta H_u$ is the heat of fusion per chain repeating unit, $V_u$ (55.1 cc/mole) and $V_1$ are the molar volumes of the repeating unit and solvent, respectively, $\phi_1$ is the volume fraction of the solvent, and $\chi_T$ (or $\mu_T$) is the Flory-Huggins interaction parameter at $T_M$. Equation (1) shows that the solution temperature $T_M$ should have a minimum value when the interaction parameter $\chi$ is at a minimum. The interaction parameter for the polymer-solvent systems which form regular solutions should have a minimum value when $\delta_1 = \delta_2$ as shown by eq. (2)

$$\chi_T = 0.34 + V_1(\delta_1 - \delta_2)^2 / RT_M \quad (2)$$

where $\delta_1$ and $\delta_2$ are the solubility parameters of solvent and polymer, respectively.

The above formula can also be used to determine the extrusion (or foaming) temperature required for the normally crystalline vinylidene chloride polymer-blowing agent compositions used by the present invention. Such is the case as the foaming temperature of the normally crystalline vinylidene chloride polymers should be a few degrees higher than the crystallization temperature of the solution. The solution temperatures $T_M$ is a good approximation for the foaming temperature of such normally crystalline polymers, as the difference between the solution temperature $T_M$ and the crystallization temperature $(T_M-T_c)$ is a very small positive number for such polymers in the blowing agents described herein.

Exemplary of useful blowing agents are the following materials:

| Group I: Halocarbons | Boiling Point (°C) | Solubility Parameter ($\delta s$) |
| --- | --- | --- |
| Isopropyl chloride | 34.8 | 8.1 |
| Ethyl chloride | 12.4 | 8.5 |
| Methyl chloride | −24.2 | 8.4 |
| Vinyl chloride | −13.9 | 7.8 |
| Dichlorodifluoromethane (F-12) | −29 | 6.1 |
| Trichlorofluoromethane (F-11) | 24 | 7.5 |
| Dichlorotetrafluoroethane (F-114) | 3.6 | 6.2 |
| Dichlorohexafluoropropane | 32 | 6.4 |
| Dichlorofluoromethane (F-21) | 8.9 | 8.0 |

-continued

| Group I: Halocarbons | Boiling Point (°C) | Solubility Parameter ($\delta s$) |
| --- | --- | --- |
| Monochlorodifluoromethane (F-22) | −40.8 | 6.5 |
| Difluoroethane (F-152A) | −24.7 | 7.0 |
| Monochlorodifluoroethane (F-142b) | −9 | 6.8 |
| Monochlorotrifluoroethane (F-133b) | 6 | 7.2 |
| 2,2-Difluoropropane | −0.6 | 7.1 |
| 1,1,1-Trifluoropropane | −13 | 7.1 |
| 2,2-Difluorobutane | 31 | 7.4 |
| 1,1,1-Trifluorobutane | 17 | 7.1 |
| 2,2,3,3-Tetrafluorobutane | 10.9 | 6.7 |
| 1,1,1,4,4,4-Hexafluorobutane | 25 | 6.6 |
| Chlorofluoromethane (F-31) | −9.1 | 8.1 |
| Perfluorocyclobutane | −5 | 6.1 |

| Group II: Hydrocarbons | Boiling Point (°C) | Solubility Parameter ($\delta s$) |
| --- | --- | --- |
| Neopentane | 9.7 | 6.3 |
| 2-Methyl propene | −6.9 | 6.7 |
| 1-Butene | −6.3 | 6.7 |
| 3-Methyl-1-butene | 20.1 | 6.7 |
| 2-Methyl butane | 27.8 | 6.7 |
| Isobutane | −11.7 | 6.8 |
| 2-Butene, trans | 0.9 | 7.0 |
| 1-Propene | −47.7 | 6.6 |
| N-butane | −0.5 | 6.6 |
| Pentane | 36.1 | 7.0 |
| 1-Pentene | 30 | 7.1 |
| 2-Butene-cis | 3.7 | 7.2 |
| 2-Methyl-1-butene | 31.2 | 7.2 |
| 2-Pentene, trans | 36.3 | 7.3 |
| 2-Pentene, cis | 36.5 | 7.3 |
| 2-Methyl-2-butene | 38.6 | 7.4 |
| 2-Methyl-1,3-butadiene | 34.1 | 7.5 |
| 1,3-butadiene | 10.8 | 7.8 |

| Group III: Ethers | Boiling Point (°C) | Solubility Parameter ($\delta s$) |
| --- | --- | --- |
| Vinyl methyl ether | 5.0 | 7.0 |
| Ethyl ether | 34.7 | 7.5 |
| Methyl ethyl ether | 7.3 | 7.6 |
| Vinyl ethyl ether | 35.6 | 7.8 |
| Methyl ether | −24.8 | 7.6 |

Group IV:

Blowing Agent Mixtures $$\delta_{mix} = \phi_1 \delta_1 + \phi_2 \delta_2 + \cdots$$

where $\delta_1$ and $\delta_2$ can be lower than 6.6 and higher than 8.7, but $\delta_{mix}$ is greater than about 6.6 and less than about 8.7.

Such blowing agents are used in amounts of from about 5 to about 25 percent based on polymer weight. Utilization of amounts less than about 5 percent are generally insufficient for adequate foaming whereas amounts in excess of about 25 percent may adversely affect the flow properties of the polymer-blowing agent mixture.

Foam Preparation

The normally crystalline vinylidene chloride polymer (which may contain conventional amounts and types of additives therefore are as plasticizers, stabilizers, nucleators and the like) must be in the form of a fine powder or thin film platelets, e.g. as obtained by the grinding of film materials, capable of absorbing the required amount of blowing agent. Further such polymers must be effectively premixed with the blowing agent prior to extrusion thereof. Generally, it is preferred that such admixture be prepared while utilizing a temperature of at least about 10°C below the boiling point of the blowing agent. It is to be noted that such boiling point may vary for a given blowing agent depending on the pressure to which the admixture is subjected. A particularly preferred technique comprises premixing such ingredients in a pressurized hopper equipped with a continuous auger type hopper stuffer. The premix is then fed substantially continuously to an extruder where such mixture is melted then passed through a cooling zone to cool the resulting gel to the desired foaming temperature. The gel is then passed through an extrusion die and foamed, optionally, between a series of forming plates. The feeding of premixed polymer-blowing agent permits the use of reduced extruder temperatures as otherwise required due to the lower melting point of the polymer-blowing agent mixture. The use of such premixture also eliminates the need for a mixing device within the extruder and thereby reduces the residence time of the polymer gel at high temperatures. Difficulties in manufacturing such foam using conventional extrusion foam processes include the problem of controlling the thermal degradation of the polymer and the problem in obtaining sufficient mixing necessary to obtain low density foams. Although the preferred method for premixing polymer and blowing agent prior to feeding the premix through an extruder is accomplished as described above; alternate methods of accomplishing such premixing may be used. By way of example, such methods include injecting the blowing agent near the hopper where the polymer powder has been compacted enough to retain the required amounts of blowing agent.

The present invention is further illustrated, but not limited, by the following specific example.

EXAMPLE 1

In each of a series of experiments polymeric foam was prepared, using the preferred technique discussed supra, from a non-plasticized copolymer of about 85 percent by weight vinylidene chloride and about 15 percent by weight vinyl chloride containing 0.3 percent by polymer weight of magnesium oxide as a heat stabilizer and 0.5 to 1 part per hundred parts of copolymer (pph) of talc as a nucleator. A blowing agent composed of 25 parts by weight methylene chloride and 75 parts by weight of trichlorofluoromethane "F-11" was added in an amount representing from about 5 to about 25 percent by copolymer weight. The premix of copolymer and blowing agent was extruded through a 3½ inch extruder having a length diameter ratio L/D of 18. The extruder screw employed had a 57 inch long gradual taper, a 7½ inch long mixing section and a 3 inch long torpedo at the end. The hopper was equipped with a diaphragm operated plunger type hopper stuffer. The extruder die was ⅛ inch in diameter and ¼ inch in length. The premixed blowing agent and polymer was fed through the hopper and such mixture subsequently heated to about 165°C to cause such mixture to melt. The melt was then cooled to an extrusion temperature of about 145°C to 150°C at the die. Stable, low density, foam was made at a rate of about 100 lbs./hour. The resulting product, in each substance, was characterized by a density of less than 15 pcf and, an average cell size of about 0.1 to about 1 mm.

These foam products were also found to be dimensionally stable, i.e., exhibited little or no increase in density after aging for four days at 25°C. Further, such foamed products did not shrink significantly even after being subjected to a temperature of 125°C. for a period of 8 hours.

By way of comparison, a portion of the copolymer described above was fed through the hopper of an extruder having an L/D ratio of 23. The polymer was melted at about 175°c, then mixed with the blowing agent described above wherein such blowing agent was added to the molten polymer through an injection port located in the mixing section of the extruder. It was observed that the blowing agent was not well mixed in the polymeric melt and had resulted in the formation of blow holes and multilayered tubes inside a relatively high density round foam. The foam produced was characterized by a very irregular cell structure.

By way of further comparison, a foam was prepared from a copolymer as described herein utilizing the process of this invention except that acetone (having a solubility parameter of 9.8) was used as the blowing agent. The resulting foamed product was a high density material, i.e., a density in excess of 15 pcf, which collapsed following extrusion thereof.

The foam materials of the present invention are particularly suited for the preparation of foam blankets and boards for residential-commercial insulation. Such foamed materials are also industrially useful as foamed sheeting for gasketing and closure liners and for a variety of packaging applications. Further, the present invention is especially useful for utilization of ground up film resulting from the manufacture of normally crystalline vinylidene chloride polymer film materials.

What is claimed is:

1. A process for forming stable low density extruded foam from normally crystalline vinylidene chloride polymer such process comprising (1) admixing a normally crystalline vinylidene chloride polymer in comminuted form with from about 5 to about 25 percent based on polymer weight of a blowing agent composed of a compound or compound mixture having a boiling point of less than about 40°C, a vapor pressure at the foaming temperature used of greater than atmospheric pressure but less than about 1000 p.s.i. and a solubility parameter of greater than about 6.6 and less than about 8.7, then (2) extrusion foaming the admixture using an extrusion temperature of from about 120°C to about 150°C.

2. The process of claim 1 wherein said normally crystalline vinylidene chloride polymer is a copolymer of vinylidene chloride and vinyl chloride.

3. The process of claim 2 wherein said copolymer is a copolymer of about 85 percent by weight vinylidene chloride and about 15 percent by weight vinyl chloride.

4. A foamed structure prepared by the process of claim 1 and characterized by a density of less than about 15 pounds per cubic foot and an average cell size of about 0.1 to about 1 mm.

* * * * *